US007903537B2

(12) United States Patent
Tao et al.

(10) Patent No.: US 7,903,537 B2
(45) Date of Patent: *Mar. 8, 2011

(54) GRAPH-BASED METHOD FOR ALLOCATING RESOURCES IN OFDMA NETWORKS

(75) Inventors: Zhifeng Tao, Allston, MA (US);
Yu-Jung Chang, Somerville, MA (US);
Jinyun Zhang, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 428 days.

This patent is subject to a terminal disclaimer.

(21) Appl. No.: 12/112,346

(22) Filed: Apr. 30, 2008

(65) Prior Publication Data

US 2009/0245085 A1 Oct. 1, 2009

Related U.S. Application Data

(60) Provisional application No. 61/039,905, filed on Mar. 27, 2008.

(51) Int. Cl.
*H04J 11/00* (2006.01)
*H04J 1/00* (2006.01)
*H04W 40/00* (2009.01)
*H04W 72/00* (2009.01)
*H04K 1/10* (2006.01)
*H04K 1/02* (2006.01)
*H03D 1/04* (2006.01)

(52) U.S. Cl. ......... 370/203; 370/281; 370/480; 455/447; 455/450; 375/260; 375/296; 375/346

(58) Field of Classification Search .............. 370/203, 370/204, 276–278, 281, 294–295, 310.2, 370/328–330, 331–334, 343–345, 431, 436–437, 370/478, 480–482; 455/101, 422.1, 446–447, 455/450, 452.1, 452.2; 375/260, 267, 285, 375/296, 299, 346–349

See application file for complete search history.

(56) References Cited

U.S. PATENT DOCUMENTS 7,069,009 B2 * 6/2006 Li et al. .................... 455/446

(Continued)

OTHER PUBLICATIONS

Necker, Marc C., "Towards Frequency Reuse 1 Cellular FDM/TDM Systems", Oct. 2006, pp. 338-346.*
Jain et al., "Impact of Inteference on Multi-hop Wireless Network Performance", Sep. 2003, ACM 1-58113-753-2/03/0009.*
Mar C Necker Ed-Wayne Clark: Integrated Scheduling and Interference Coordination in Cellular OFDMA Networks Broadband Communications, Networks and Systems, 2007. Broadnets 2007. Fourth International Conference On, IEEE, Piscataway, NJ USA, Sep. 10, 2007, pp. 559-566.

(Continued)

*Primary Examiner* — Aung S Moe
*Assistant Examiner* — Redentor Pasia
(74) *Attorney, Agent, or Firm* — Dirk Brinkman; Gene Vinokur

(57) ABSTRACT

A method allocates radio channel resources in an orthogonal frequency-division multiple access network including a set of base stations (BS) and a set of mobile stations (MS). For each BS, a diversity set is maintained for the sets of MS. Each BS determines possible interference at the MS based on the diversity set. A graph is constructed, in which nodes represent the sets of MS, mid each edge between a pair of nodes represents channel interference between the MS represented by the pair of nodes. A weight is assigned to each edge, which reflects interference between the two MSs connected by the edge. The interference graph is partitioned into non-overlapping clusters of nodes based on a structure of the interference graph, the potential interference, so that a sum of the weights of the edges between each cluster is maximized. Based upon the graph partitioning, the channel resources are allocated to the mobile stations in order to maximize the system capacity.

18 Claims, 11 Drawing Sheets

U.S. PATENT DOCUMENTS

| | | | |
|---|---|---|---|
| 2002/0028677 A1* | 3/2002 | Johnson et al. | 455/446 |
| 2005/0075104 A1* | 4/2005 | Jain et al. | 455/423 |
| 2005/0239473 A1* | 10/2005 | Pan et al. | 455/453 |
| 2005/0277444 A1* | 12/2005 | Rensburg et al. | 455/562.1 |
| 2006/0154671 A1* | 7/2006 | Kang et al. | 455/450 |
| 2008/0049672 A1* | 2/2008 | Barak et al. | 370/330 |
| 2008/0107035 A1* | 5/2008 | Zhu et al. | 370/241 |
| 2008/0159316 A1* | 7/2008 | Dutta et al. | 370/406 |

OTHER PUBLICATIONS

Andnd Prabhu Subramanian et al.; 'Fast Spectrum Allocation in Coordinated Dynamic Spectrum Access Based Cellular Networks' New Frontiers in Dynamic Spectrum Access Networks, 2007. DYSPAN 2007. $2^{nd}$ IEEE International Symposium on, IEEE, PI, Apr. 1, 2007, pp. 320-330.

* cited by examiner

| | Anchor BS | Adjacent BSs |
|---|---|---|
| MS 1 | 1 | 3 |
| MS 2 | 3 | none |
| MS 3 | 2 | 3 |
| MS 4 | 3 | 1 |
| MS 5 | 2 | 1, 3 |

*Fig. 5*

GRAPH-BASED METHOD FOR ALLOCATING RESOURCES IN OFDMA NETWORKS

RELATED APPLICATION

This U.S. Patent Application claims priority to U.S. Provisional Patent Application 61/039,905 "Graph-Based Method for Allocating Resources in OFDMA Networks," filed by Tao et al. on Mar. 27, 2008, and incorporated herein by reference.

FIELD OF THE INVENTION

This invention relates generally to resource allocation in wireless networks, and more particularly to resource allocation in Orthogonal Frequency Division Multiple Access cellular networks using a graph-based approach.

BACKGROUND OF THE INVENTION

OFDMA

Orthogonal frequency-division multiplexing (OFDM) is a modulation technique used at the physical layer (PHY) of a number of wireless networks, e.g., networks designed according to the well known IEEE 802.11a/g and IEEE 802.16/16e standards. Orthogonal Frequency Division Multiple Access (OFDMA) is a multiple access scheme based on OFDM. In OFDMA, separate sets of orthogonal tones (sub-channels) and time slots are allocated to multiple transceivers (users or mobile stations) so that the transceivers can communicate concurrently. OFDMA is widely adopted in many next generation cellular systems such as 3GPP Long Term Evolution (LTE) and IEEE 802.16m due to its effectiveness and flexibility in radio resource allocation.

OFDMA Resource Allocation

The radio spectrum is a scarce resource in wireless communications, and therefore an efficient use of it is needed. The rapid growth of wireless applications and subscriber users have called for a good radio resource management (RRM) scheme that can increase the network capacity and, from a commercial point of view, save deployment cost. Consequently, developing an effective radio resource allocation scheme for OFDMA is of significant interest for industry.

The fundamental challenge in resource allocation is the inequality between the scarce spectrum that is available, and the vast area to be covered and large number of users to be served. In other words, the same frequency spectrum must be reused in multiple geographical areas or cells. This will inevitably incur inter-cell interference (ICI), when users or mobile stations (MSs) in adjacent cells use the same spectrum. In fact, ICI has been shown to be the predominant performance-limiting factor for wireless cellular networks. As a result, a significant amount of research has been devoted to developing ICI-aware radio resource allocation for cellular networks In order to maximize the spectral efficiency, frequency reuse factor of one is used in OFDMA cell deployment, i.e., the same spectrum is reused in each and every cell. Unfortunately, this high spectrum efficiency is also accompanied by high detrimental ICI. Therefore, a good ICI management scheme on top of OFDMA is needed to leverage the OFDMA technology.

OFDMA Resource allocation has been studied extensively for tile single-cell case. Most of existing methods focus on the optimization of power or throughput under the assumption that each MS would use different subchannel(s) in order to avoid intra-cell interference. Another key assumption in single-cell resource allocation is that the base station (BS) has the full knowledge of channel signal-to-noise ratio (SNR) of link between itself and every MS. In the downlink (i.e., transmission from BS to MS), this SNR is normally estimated by the MS and fed back to the BS. In the uplink (i.e., transmission from MS to BS), BS can estimate the SNR directly based upon the signal it receives from every MS. Its counterpart in the multi-cell scenario, namely the signal-to-interference-and-noise ratio (SINR), is however more difficult to obtain because the interference can come from multiple cells and would depend on a variety of factors such as distance, location, and occupied channel status of interferers which are unknown before resource allocation. This results in mutual dependency of ICI and complicates the resource allocation problem. Thus, a practical multi-cell resource allocation scheme that does not require global and perfect knowledge of SINR is highly desirable.

Inter-Cell Interference Coordination (ICIC)

ICIC is a technique that can effectively reduce ICI in cell-edge regions. It is achieved by allocating disjoint channel resources to cell-edge MSs that belong to different cells. Because cell-edge MSs are most prone to high ICI, the overall ICI can be substantially reduced by judicious coordination of channel allocation among cell-edge MSs. More specifically, ICIC reduces the number of interferers and/or the "damage" each interferer causes. The latter can be achieved by, for instance, allocating the same resource to geographically farther apart MSs so that due to path loss the interference is mitigated.

However, ICIC solely based on avoiding resource collision for cell-edge users can offer only limited performance gain in the downlink communications, because it overlooks the interference caused by transmission from the BS to cell-center MSs. The embodiments of the invention aim to propose a holistic channel allocation scheme where all MSs, cell-center and cell-edge alike, are taken into ICI management consideration.

Spatial Division Multiple Access (SDMA)

SDMA provides multi-user channel access by using multiple-input multiple-output (MIMO) techniques with precoding and multi-user scheduling. SDMA exploits spatial information of the location of MSs within the cell. With SDMA, the radiation patterns of the signals are adapted to obtain a highest gain in a particular direction. This is often called beam forming or beam steering. BSs that support SDMA transmit signals to multiple users concurrently using the same resources. Thus, SDMA can increase network capacity.

Base Station Cooperation (BSC)

Base station cooperation (BSC) allows multiple BSs to transmit signals to multiple MSs concurrently sharing the same resource (i.e., time and frequency). It utilizes the SDMA technique for BSs to send signals to MSs cooperatively and is specifically used in cell-edge MSs that are within the transmission ranges of multiple BSs. Thanks to cooperation, the interfering signal becomes part of the useful signal. Thus, BSC has two advantages: provision of spatial diversity and ICI reduction.

Diversity Set

Typically, each MS is registered at and communicates with one BS, which is called the anchor (or serving) BS. However, in some scenarios such as handover, The MS can concurrently communicate with more than one BS. A diversity set is defined in the IEEE 802.16e standard to serve this purpose. The diversity set track of the anchor BS and neighboring BSs that are within the communication range of the MS. The information in the diversity set is maintained and updated at the MS as well as the BS, and will be used in the graph-based method in this invention.

Graph-Based Framework in Prior Channel Allocation

The channel allocation problem in conventional (non-OFDMA) cellular and mesh networks has been solved using a graph coloring approach. In the conventional problem formulation, each node in the graph corresponds to a BS or an access point (AP) in the network to which channels are allocated. The edge connecting two nodes represents the potential co-channel interference, which typically corresponds to the geographical proximity of the BSs. Then, the channel allocation problem that respects the interference constraints becomes the node coloring problem, where two interfering nodes should not have the same color, i.e., use the same channel.

In conventional networks, if two adjacent base stations transmit at the same time using the same spectrum, then they cause interference to each other in the MSs. Thus, in the conventional graph, all that is required is to ensure that adjacent nodes representing BSs have different colors.

That solution is in applicable to OFDMA networks, where the frequency reuse factor is one, and all BS do use the same spectrum. In addition, conventional graphs do not consider technologies, such ICIC and BSC, as described above.

SUMMARY OF THE INVENTION

The embodiments of the invention provide a practical and low-complexity multi-cell OFDMA downlink channel allocation method using a graph-based approach. The graph-based approach differs from the prior art in two fundamental aspects.

First, while the prior art minimizes the number of subchannels in use, under an interference constraint, the invention uses a fixed and predetermined number of subchannels at disposal in OFDMA networks. Because complete avoidance of interference is not physically feasible, a proper and well administered compromise is considered.

Second, nodes in the graph of our case should denote MSs rather than BSs, because it is MSs, not BSs, that are allocated channels in OFDMA networks. Furthermore, the location and movement of MSs will change the interference dynamics and consequently the graph. In the prior art graph, the base stations represented by the nodes in the graph are stationary, thus mobility of the stations is not an issue, and the problem is relatively simple to solve.

The method includes two phases:
1) a coarse-scale interference management scheme; and
2) a fine-scale channel allocation scheme.

In the first phase, the interference management is performed using a graph-based framework. The interference information is based on the diversity sets maintained at BSs and the MSs and presented in the form of an interference graph. Then, the graph is partitioned into non-overlapping clusters according to an interference management criteria, such as ICIC and BSC. In this phase, ICIC, BSC and SDMA techniques are all incorporated in the framework, and no precise SINR information is required.

In the second phase, resource allocations is performed by allocating subchannels to clusters obtained in the first phase, either randomly or considering instantaneous channel conditions.

BRIEF DESCRIPTION OF THE DRAWINGS

FIG. 5 is a table of a diversity set according to an embodiment of the invention;

DETAILED DESCRIPTION OF THE PREFERRED EMBODIMENT

Graph-based OFDMA Resource Allocation

Figure 1:
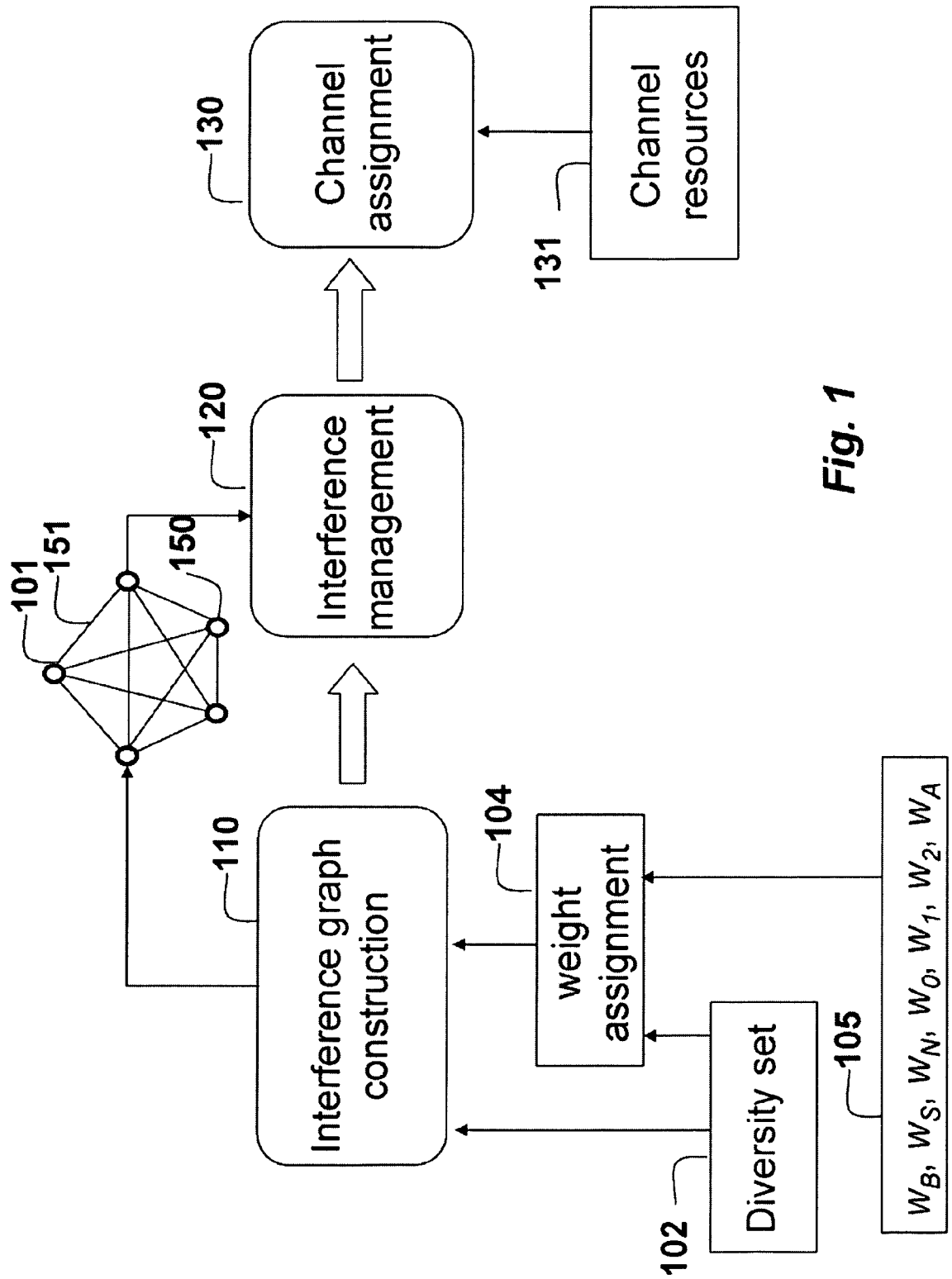
FIG. 1 is a flow chart of a method for allocating channel resources in an in orthogonal frequency-division multiple access (OFDMA) network according to embodiments of the invention.

FIG. 1 shows a method for allocating resources to mobile stations in an orthogonal frequency-division multiplexing (OFDM) network according to embodiments of the invention. The OFDMA network includes multiple base stations (BSs) and multiple mobile stations (MSs).

We construct 110 an interference graph 101. In the graph, nodes 150 represent the MSs, and edges 151 connecting the nodes represent potential interference between the mobile stations represented by the nodes connected by the edges, as well as a quality of the channels used by the mobile stations.

The interference graph is constructed using diversity sets 102 maintained by the BSs and the MSs in the OFDMA network. Each BS can maintain a diversity set for the set of MSs and has knowledge of all diversity sets served by the BS. The BSs can exchange the diversity sets so that all BSs have all diversity sets, and the MSs can maintain diversity sets for the base stations with which they are associated.

The potential interference at the MSs is based on the corresponding established diversity set. A proper weight assignment 104 is used to construct the edges in the interference graph, which represent the interference between MSs (nodes). The possible weights 105 are described in greater detail below.

Interference management 120 is preformed using the interference graphs 101. Heuristic methods are adopted to partition the graph into disjoint clusters.

Channel assignment 130 is accomplished after the clustering of the graph, using the channel resource 131 information. Subchannels are assigned to clusters and nodes (MSs) in the same cluster are assigned the same subchannel. The assignment may be done either randomly or opportunistically considering instantaneous channel information in the assignment.

Spectrum Allocation

Figure 2A:
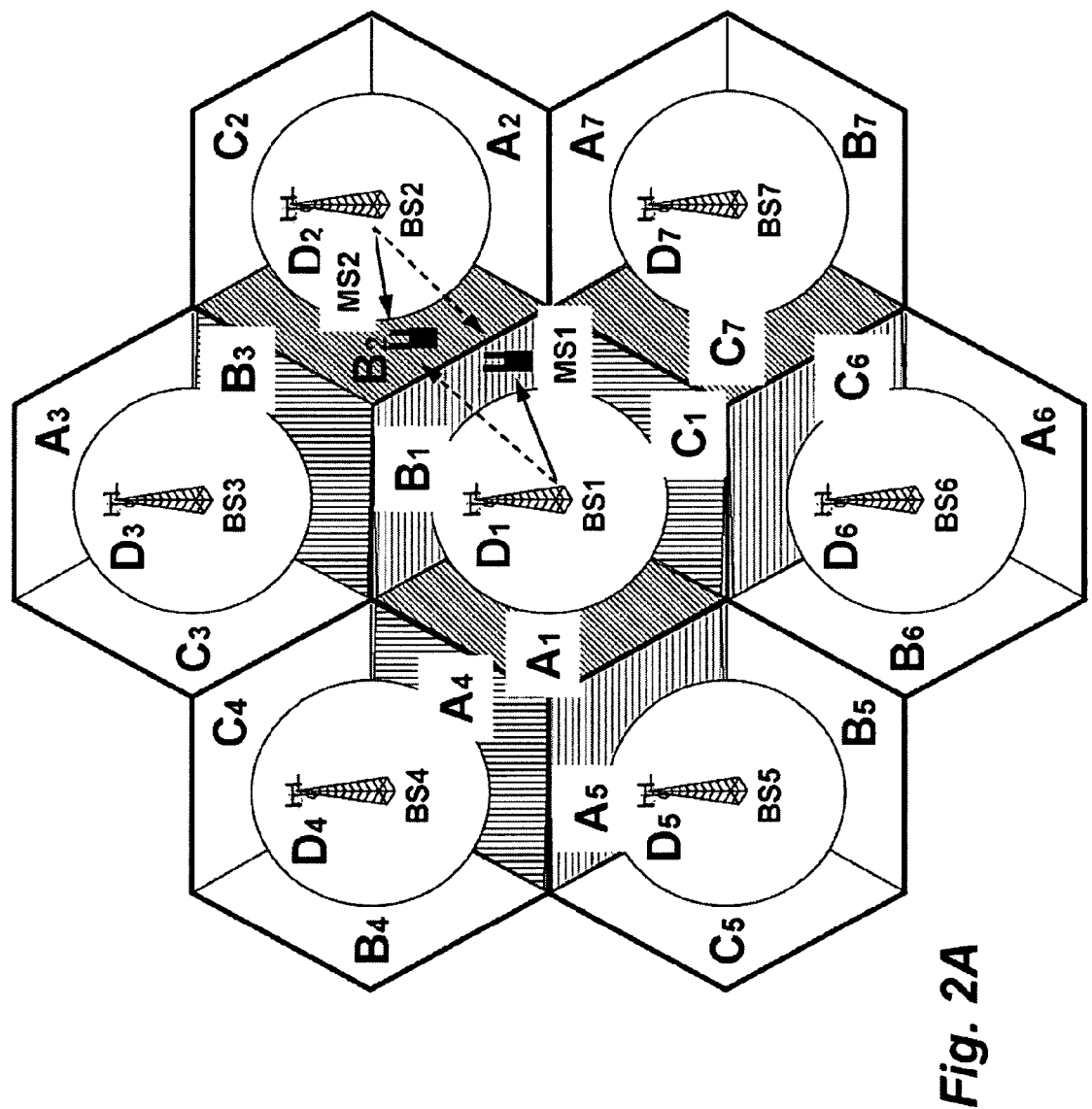
FIG. 2A is a schematic of an ICIC spectrum allocation implemented in adjacent cells and an exemplary ICIC scenario with 2 MSs and 2 BSs according to embodiments of the invention.
Figure 2B:
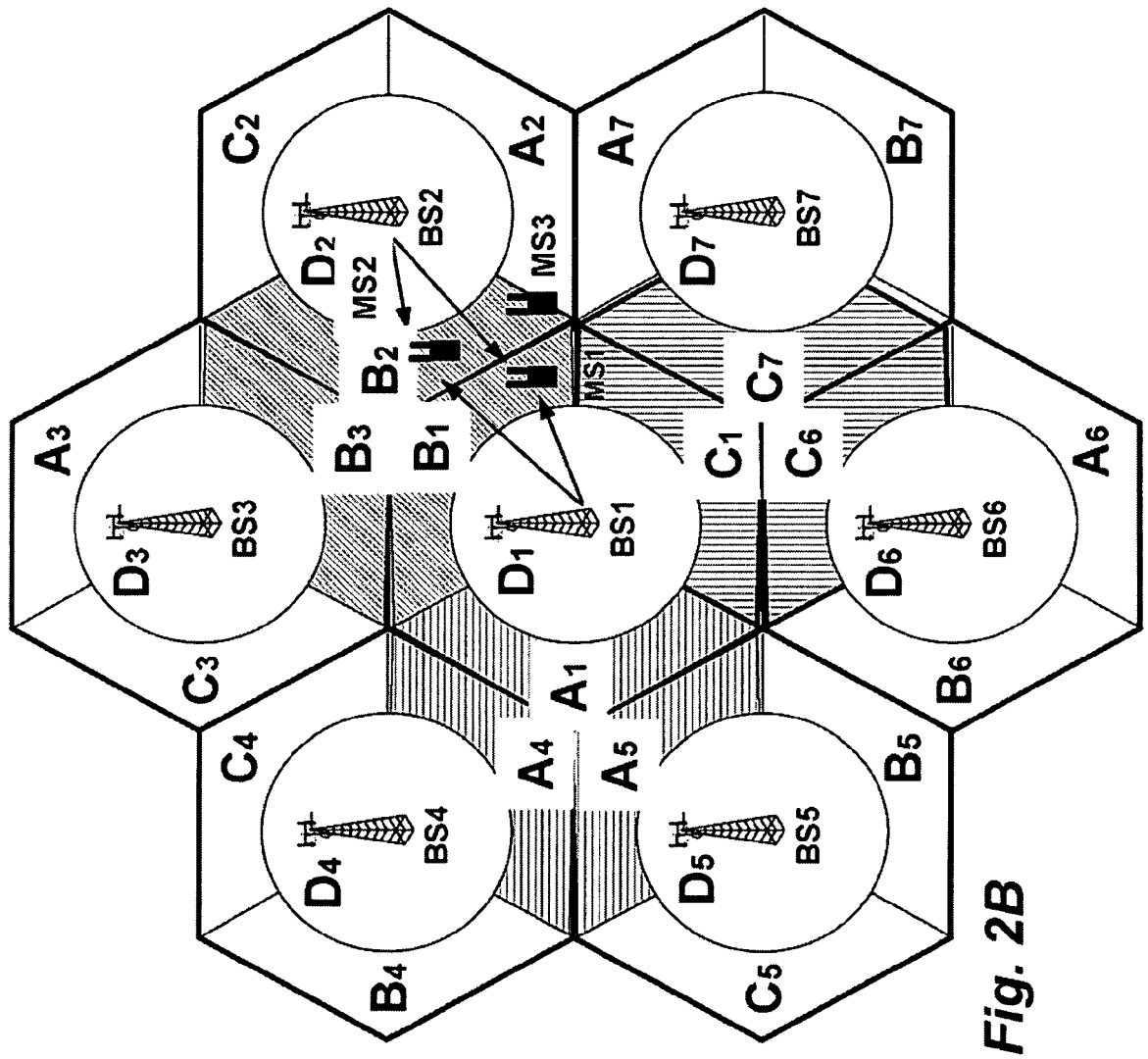
FIG. 2B is a schematic illustration of the BSC spectrum allocation implemented in adjacent cells and an exemplary BSC scenario with 2 MSs and 2 BSs according to embodiments of the invention.

FIGS. 2A-2B show spectrum allocation for OFDMA multi-cell networks described in the embodiments of our invention. Seven cells are shown. This can be easily generalized to more cells. The frequency reuse factor is one. That is, each cell uses the entire network bandwidth. Each cell is geographically partitioned into cell-center and boundary regions, with boundary region are further portioned into three sectors.

In FIGS. 2A and 2B, $A_i$, $B_i$ and $C_i$ refer to the three sectors in the boundary region respectively, and $D_i$ refers to the cell-center, i=1, . . . , 7. Note that the sectorization shown in FIGS. 2A and 2B serves only to illustrate the concept of resource allocation in terms of geographical regions and is not restrictive. In the Figures, channels in the sectors with the same shading share the same resources, e.g., frequency subchannels, and can therefore potentially interfere with each other.

Note that the cell center is farther from the adjacent cells and thus the transmission from BS to the cell center MSs cause less ICI to the MSs in adjacent cells. In contrast, the cell boundary is closer to the adjacent cells and thus the transmission from BS to the boundary MSs normally causes (and experience) stronger ICI to (from) MSs in the adjacent cells. In other words, resource allocation in boundary region should be more carefully administered so that ICI can be mitigated. This can be achieved by performing boundary planning in combination with interference management schemes such as ICIC or BSC.

ICIC Scenario

ICIC is achieved by allocating disjoint channel resources to boundary MSs that belong to different cells. This is shown in FIG. 2A by different shading patterns, where a non-overlapping spectrum is allocated to MS 1 and MS 2 located in adjacent $B_1$ and $B_2$ sectors, respectively. Therefore, the potential interference caused by downlink signal to each other, can be avoided. In general, ICIC suggests allocation of disjoint spectrum to channels in adjacent boundary regions (i.e., $A_1$, $A_4$ and $A_5$; $B_1$, $B_2$ and $B_3$; $C_1$, $C_6$ and $C_7$) to reduce interference.

BSC Scenario

BSC is achieved by allocating overlapping spectrum to MSs in adjacent boundary regions. As shown in. FIG. 2B, overlapping spectrum is allocated to MS 1 and MS 2 located in adjacent $B_1$ and $B_2$ sectors, respectively. Then, BS 1 and BS 2 transmit signals jointly to both MS 1 and MS 2 in the same frequency band. Thus, the potential interference caused by downlink signal to each other is replaced by useful signals (shown by solid arrows). In general, BSC suggests allocation of overlapping spectrum to adjacent boundary regions (i.e., $A_1$, $A_4$ and $A_5$; $B_1$, $B_2$ and $B_3$; $C_1$, $C_6$ and $C_7$) to allow cooperation, as shown in FIG. 2B. This would never be possible in conventional networks.

BSC can be integrated with intra-cell SDMA, which allows a BS to transmit to its multiple serving MSs using the same OFDMA resource. For instance, FIG. 2B shows that if BS 2 communicates with MS 2 and MS 3 using SDMA, MS 1, MS 2 and MS 3 can participate in a 3-MS, 2-BS BSC scenario.

In the following, we describe our interference graphs-based resource allocation method for OFDMA-based multi-cell networks. Note that the method allows the use of both ICIC and BSC management schemes concurrently.

First Phase: Interference Management

Figure 3:
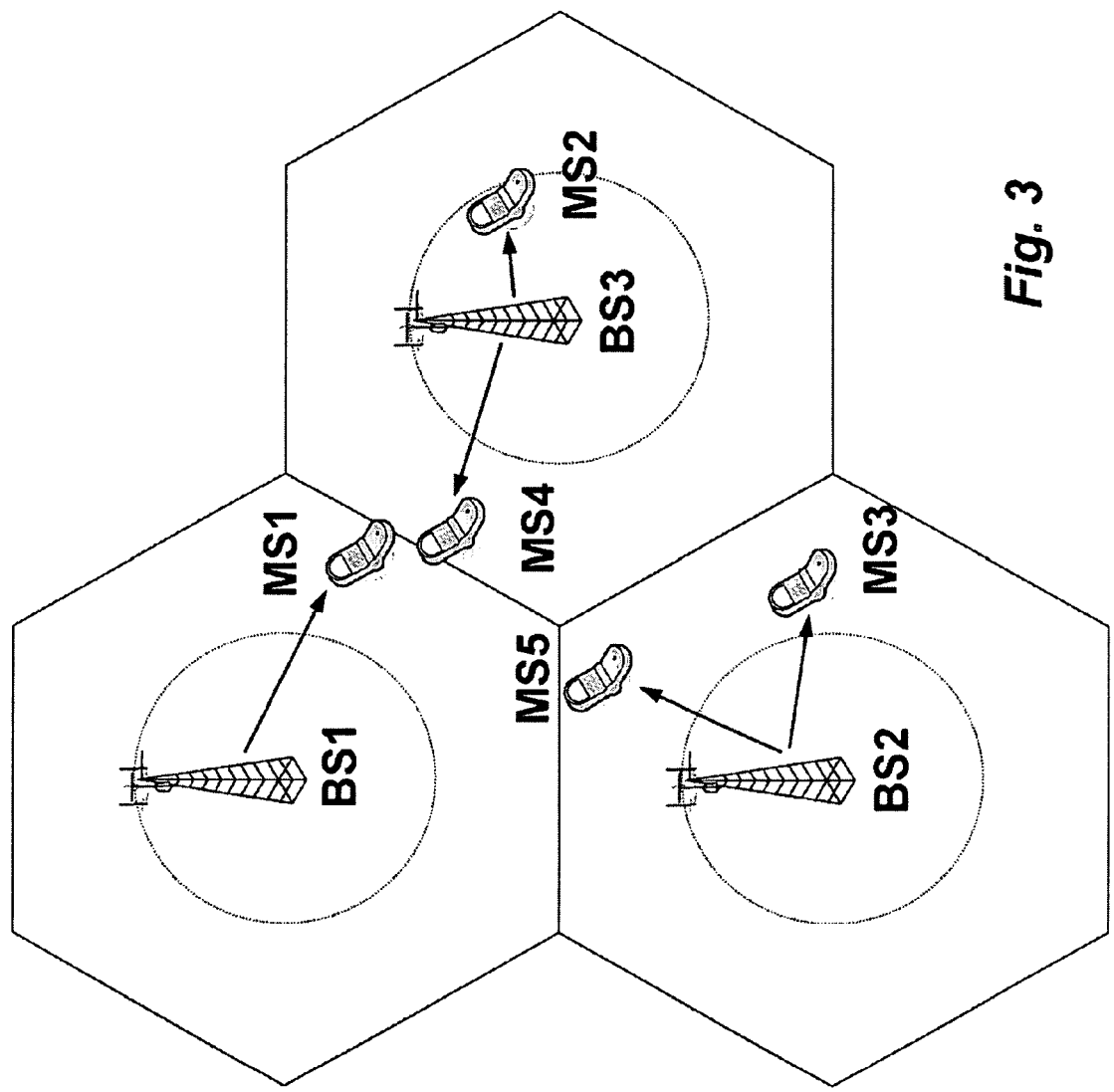
FIG. 3 is a schematic of a multi-cell network according to embodiments of the invention.

FIG. 3 shows an example arrangement of BSs and MSs. We want to determine the strength of interference from the geographic locations of the MSs, along with the instantaneous channel state information (CSI), which is indicative of the channel quality. We use this information to construct the corresponding interference graphs 101 as shown in greater detail in FIG. 4.

Figure 4:
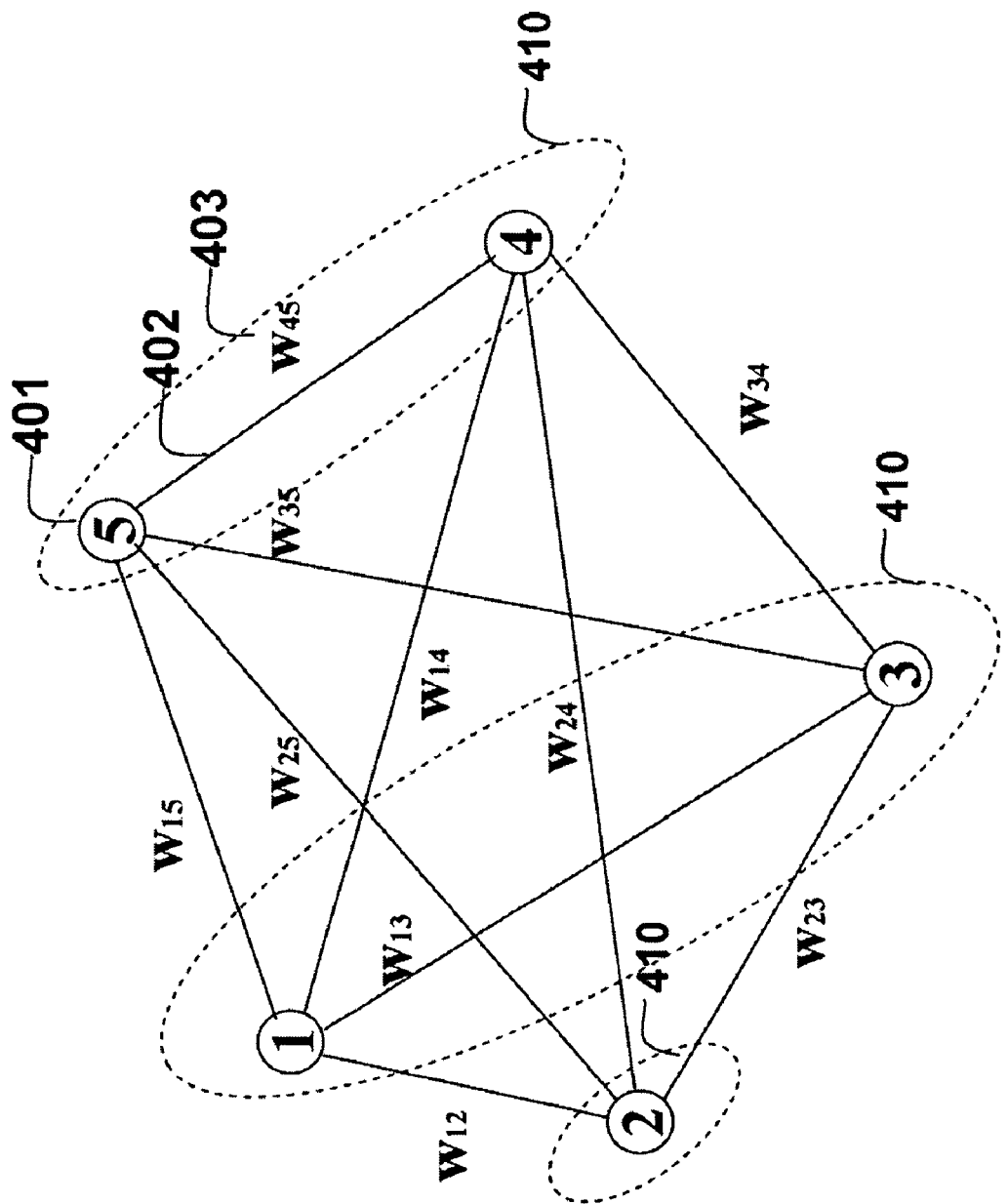
FIG. 4 is an interference graph constructed for a multi-cell multi-transceivers scenario according to an embodiment of the invention.

In FIG. 4, each node 1, for=1, . . . , 5, represents an MS. All pairs of nodes are connected by N parallel edges, if assuming there are N pieces of OFDMA resources, e.g., subchannels, in the network. Each of the N parallel edges has an associated "cost" or weight w which represents the potential interference between two MSs. For example, the weight between node a and node b, a<b, is denoted by $w_{ab}$ in FIG. 4. The higher tile value of $w_{ab}$, the stronger the potential interference between MSs a and b.

We see a close relationship between the well known max k-cut in general graph theory, and the channel allocation problem in OFDMA networks that takes interference management into consideration. In graph theory, a cut is a partition of the vertices of the graph into multiple sets or clusters. The size of a cut is the total number of edges crossing the cut. In our weighted graphs, the size of the cut is the sum of weights of the edges crossing the cut.

A cut is maximal (max) if the size of the cut is not smaller than the size of any other cut. By generalizing a cut to k cuts, the max k-cut process is to find a set of k cuts that is not smaller in size than any other k cuts. This is an NP-complete problem for a graph with a large number of nodes.

Consequently, we use a heuristic method that can efficiently produce an approximate solution. Thus, given N subchannels and M MSs, a good solution for the channel allocation problem is solved by the max k-cut process.

The goal of the max k-cut process is to partition the interference graph in FIG. 4 into clusters 410, so that the inter-cluster edge weight is maximized.

Each cluster corresponds to an OFDMA resource, e.g., subchannel. Nodes (or MSs) in the same cluster are allocated the same subchannel resources. In the goal of maximizing the inter-cluster edge weight, the result tends to place strong interferers into different clusters or equivalently, separate the interferers on different subchannels. This helps to reduce ICI.

Edge Weight Construction for the Interference Graph

The embodiments of the invention provide a method to construct the edge weight, $w_{ab}$, without accurate SINR measurements because the acquisition of related SINR measurement prior to the channel allocation is difficult, if feasible at all, in practice. The basic idea is to determine the weight associated with edge (a,b) based upon the diversity set information 102 maintained at base station (BS) for MSs a and b.

FIG. 5 shows the diversity set for the example shown in FIG. 3. In FIG. 5, each row 501 indicates the diversity set maintained at the BS for the corresponding MS. Each MS has an anchor BS 511, and possibly several adjacent BSs 512, if the MS is located near the cell boundary. The diversity set contains useful geographical information that is related to interference between MSs. The geographical information represents a topology or "structure" of the network. Hence, this structure is reflected in the interference graphs.

In addition, we can determine the potential interference between any two MSs from the diversity set as described below.

MS 2 and MS 4 are in the same cell and have the same anchor BS. Therefore, if they are allocated the same OFDMA resource (e.g., subchannel), they cause intra-cell interference to each other unless they perform SDMA.

The anchor BS of MS 1 is in the adjacent BS set of MS 4. Similarly, the anchor BS of MS 4 is in the adjacent BS set of MS 1. This implies that MS 1 and MS 4 potentially cause interference to each other, if they are allocated with the same OFDMA resource (e.g., subchannel). For the same reason, MS 1 and MS 4 are capable of performing BSC. Thus, we can conclude that MS 1 and MS 4 have ICI with each other unless they perform BSC.

The anchor BS of MS 4 is in the adjacent BS set of MS 3. Thus, MS 4 and MS 3 cause interference to each other if they use the same OFDMA resource (e.g., subchannel). However, because the anchor BS of MS 3 is not in the adjacent BS set of MS 4, MS 3 and MS 4 cannot perform BSC. MS 1 and MS 3 do not interfere with each other, as the anchor BS of neither MS is in the adjacent BS set of the other MS.

The above analysis is performed for every pair of nodes followed by a weight assignment. In one embodiment, there are seven possible weight values 105 that can be selected for edges between any two nodes, $$w_B, w_S, w_N, w_0, w_1, w_2, w_A,$$

where the weights $w_B$, $w_S$, $w_N$ and $w_A$ correspond to weights associated with BSC, SDMA, no-interference, and intra-cell interference, respectively, and $w_0$, $w_1$, $w_2$ are ICI weights at various interference levels depending on the geographic location of the two MSs.

That is, the mutual ICI between two MSs located in two different cells is the weakest if each MS is in the center (denoted by $w_0$) of its own cell, medium if one MS is at the boundary of one cell and the other in the center of the other cell (denoted by $w_1$), and strongest if both MSs are on the boundary of its own cell (denoted by $w_2$).

Overall, the seven weight values can be ranked as $$w_B \approx w_S \ll w_N < w_0 < w_1 < w_2 \ll w_A.$$

Note that $w_B$ and $w_S$ are the smallest because they require that the MSs use the same subchannel, and $w_A$ is the largest because we would like to completely avoid the intra-cell interference.

Figure 6:
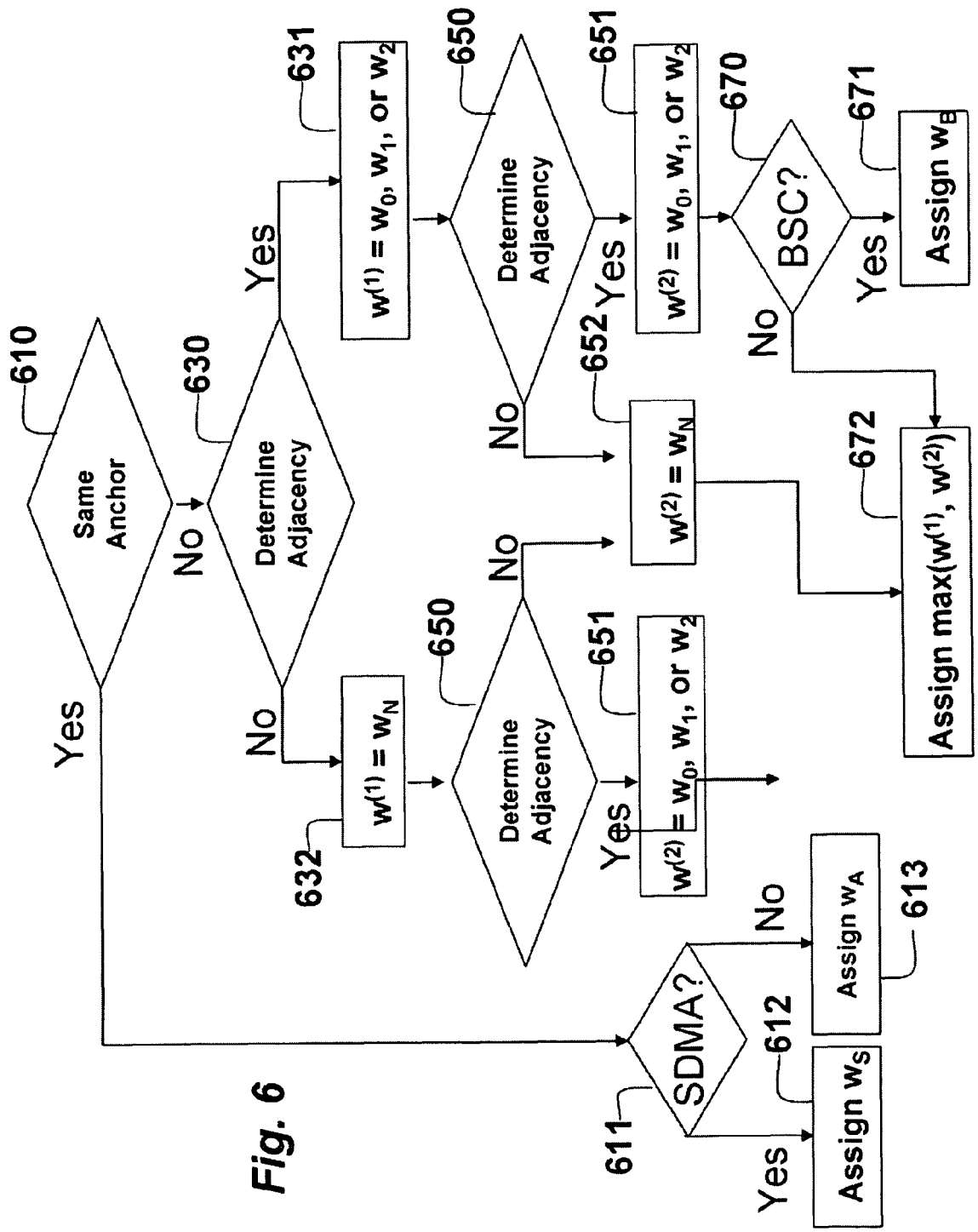
FIG. 6 is a flow chart of the method to determine the interference-related edge weight in FIG. 4 according to an embodiment of the invention.

The complete method to determine the edge weight is summarized by the flow chart in FIG. 6.

First, the anchor BS of MS a and MS b are checked 610. If they are the same, the weight decision can be made directly. We determine 611 if SDMA is used and assign $w_{ab}$ as $w_S$ 612 or $w_A$ 613 accordingly.

If they are not the same, then further procedures are needed. Specifically, anchor BS of MS a is checked 630 whether it is in MS b's adjacent BS diversity sets, and temporary weight ($w_0$, $w_1$, $w_2$) 631 or $w_N$ 632 is assigned accordingly. Likewise, anchor BS of MS b is checked 650 whether it is in MS a's adjacent BS diversity sets, and temporary weight ($w_0$, $w_1$, $w_2$) 651 or $w_N$ 652 is assigned accordingly. If both anchor BSs are in each other's adjacent BS set, then BSC is qualified and is determined 670 to be used or not. If BSC is used, assign $w_B$ 671; otherwise, assign max($w^{(1)}$, $w^{(2)}$) 672.

For one embodiment, the interference-related edge weights are $$(w_B, w_S, w_N, w_0, w_1, w_2, w_A) = (-10^3, -10^3 + 50, 0, 50, 100, 200, 10^5).$$

A small change in the weight does not change the result. Note that graph edge weight different from the ones described above can also be used.

Figure 7:
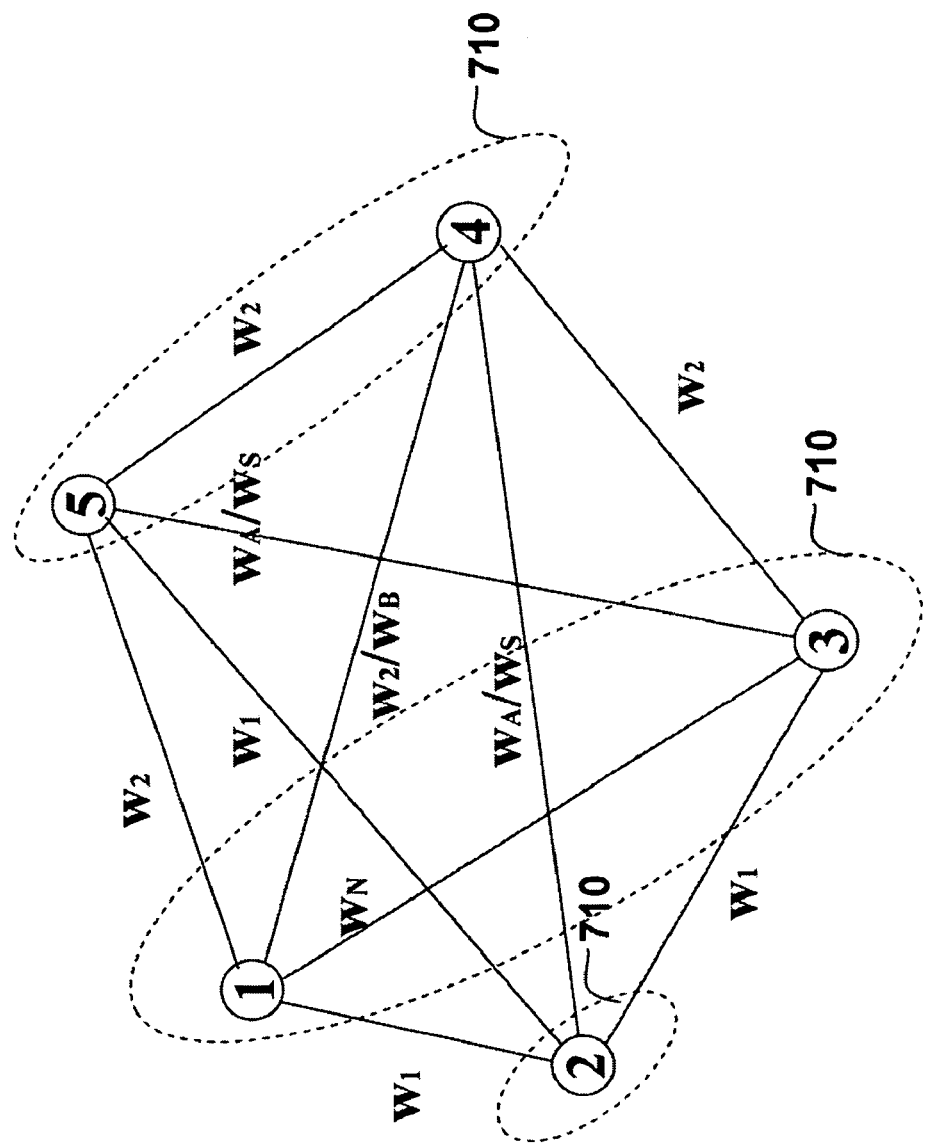
FIG. 7 is an interference graph with the edge weights assigned based on the method in FIG. 6.

The resulting interference graph with assigned weights for FIG. 3 is illustrated in FIG. 7, where some edges contain two possible weights depending on the actual configuration of MSs. For example, MS 1 and MS 4 may perform ICIC (with weight $w_2$) or BSC (with weight $w_B$). MS 2 and MS 4 (or MS 3 and MS 5) can adopt SDMA (with weight $w_S$) or not (with weight $w_A$). For other pairs of nodes with ICI, we employ ICIC. Note that BSC and SDMA are optional functionality which may be incorporated when this is physically feasible.

Clustering

Figure 8:
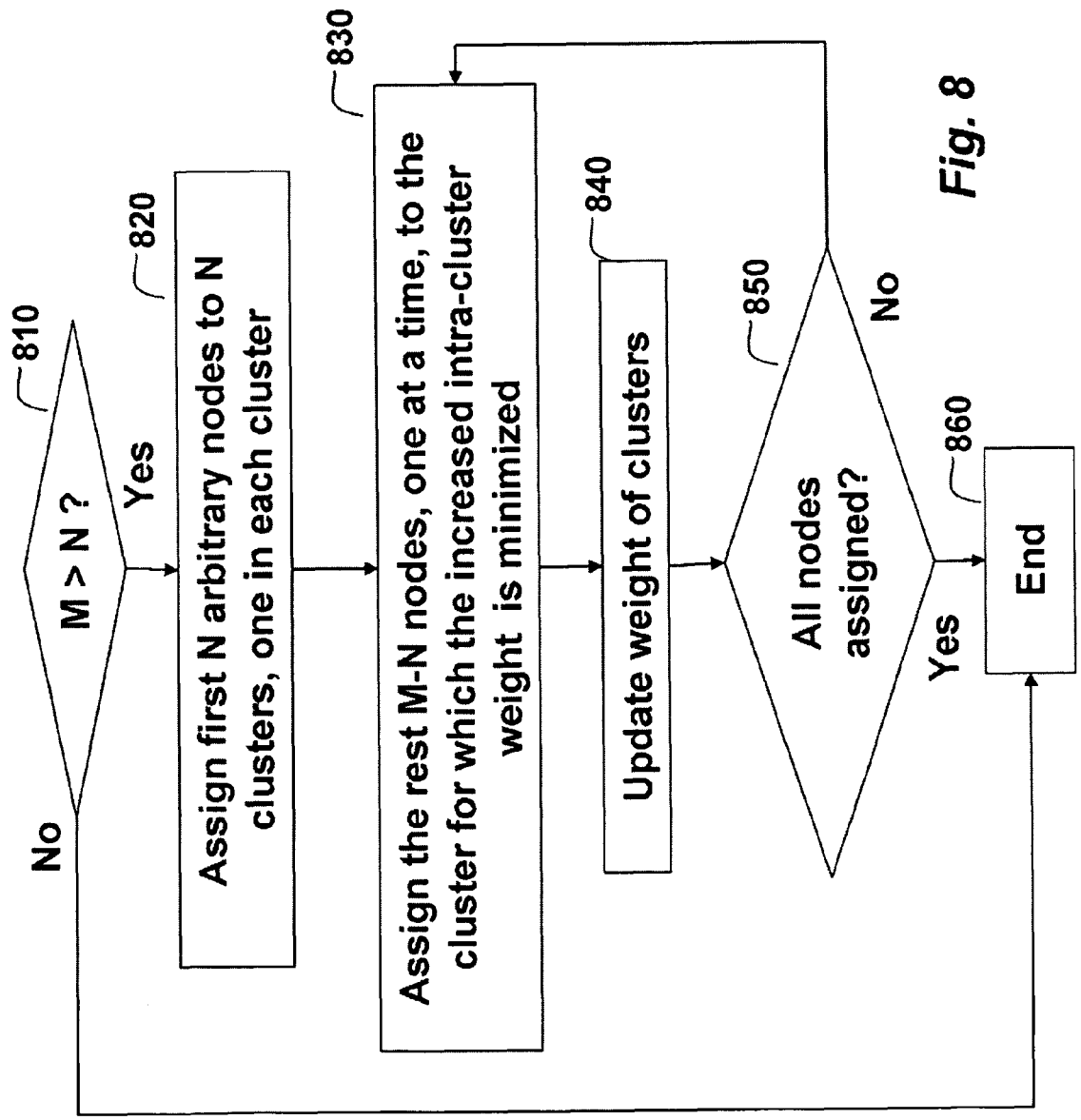
FIG. 8 is a flow chart of a method used in a first-phase of interference management according to embodiments of the invention.

The conventional solution for the max k-cut process is computationally prohibitive for large graphs, i.e., a large number of MSs. Thus, as shown in FIG. 8, a suboptimal heuristic method is described to solve the problem.

Given N OFDMA resource, e.g., subchannels, and M MSs, our objective is to partition of the interference graph of FIG. 7 into N clusters 710, so that the inter-cluster edge weight is maximized.

First, the method checks 810 whether M>N. The clustering problem becomes trivial when M≦N, because the amount of OFDMA resource available for allocation (N) is greater than or equal to what is needed by the MSs (M). In this case, the method ends 860 with the optimal solution.

If M>N, the method proceeds by first assigning 820 N arbitrarily selected nodes to N clusters, one in each cluster. Then, the remaining M−N nodes are iteratively assigned 830 to the cluster so that an increase in intra-cluster weights is minimized.

After the assignment is done, the intra-cluster weight of tile cluster is updated 840.

When all nodes are assigned 850 into clusters, the method ends 860.

The complexity of this heuristic method is proportional to the sum of the number of edges, nodes and clusters in the graph. For our particular case with M nodes and N clusters, this heuristic method has complexity $O(M^2/2 + M/2 + N)$.

Second Phase: Channel Allocation

After the first-phase allocation, the MSs are grouped into N clusters 710 for subchannel allocation. In the second phase, we allocate the subchannel to the cluster. Among (N!) possible subchannel allocation choices, the second-phase allocation finds one that optimizes the instantaneous channel quality.

Method to Solve the Second Phase

Figure 9:
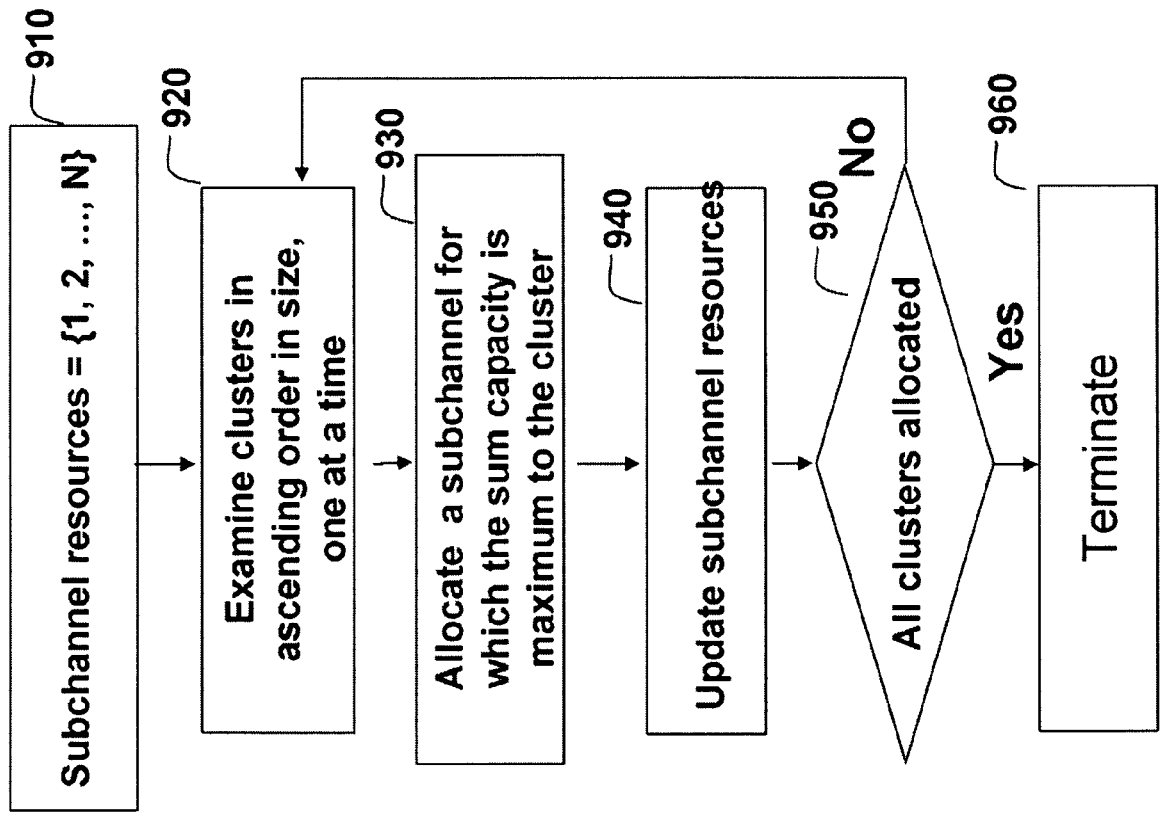
FIG. 9 is a flow chart of a method used in a second-phase SNR-aware channel allocation problem according to embodiments of the invention.

As stated above, an exhaustive search through all (N!) choices to solve the second phase problem is also computationally intractable. We describe a heuristic suboptimal method that iteratively allocates subchannels to clusters as shown in FIG. 9. We call this method SNR-aware channel allocation.

In FIG. 9, the initial subchannel resources are $\{1, \ldots, N\}$ 910. The N clusters are ordered from small to large in terms of the number of nodes contained in the cluster, ties are broken arbitrarily. The resources are allocated to the clusters in the ascending order of the size of the clusters 920.

For each cluster, the subchannel, for which the sum capacity is maximum for this cluster, is allocated 930 to the cluster. The remaining sources are updated 940 accordingly. If all clusters have been allocated resource 950, then terminate 960. Otherwise, the procedure continues for the next larger cluster.

This heuristic method that iteratively allocates subchannels to clusters is of complexity $O(N^2)$.

An alternative random channel allocation can also be used here to solve the second-phase problem. In this method, one allocation out of (N!) choices is randomly picked as the solution. The complexity of this random allocation method is O(1). However, the performance of the random channel allocation may not be as good as that of the heuristic method described above.

Performance Evaluation

Figure 10:
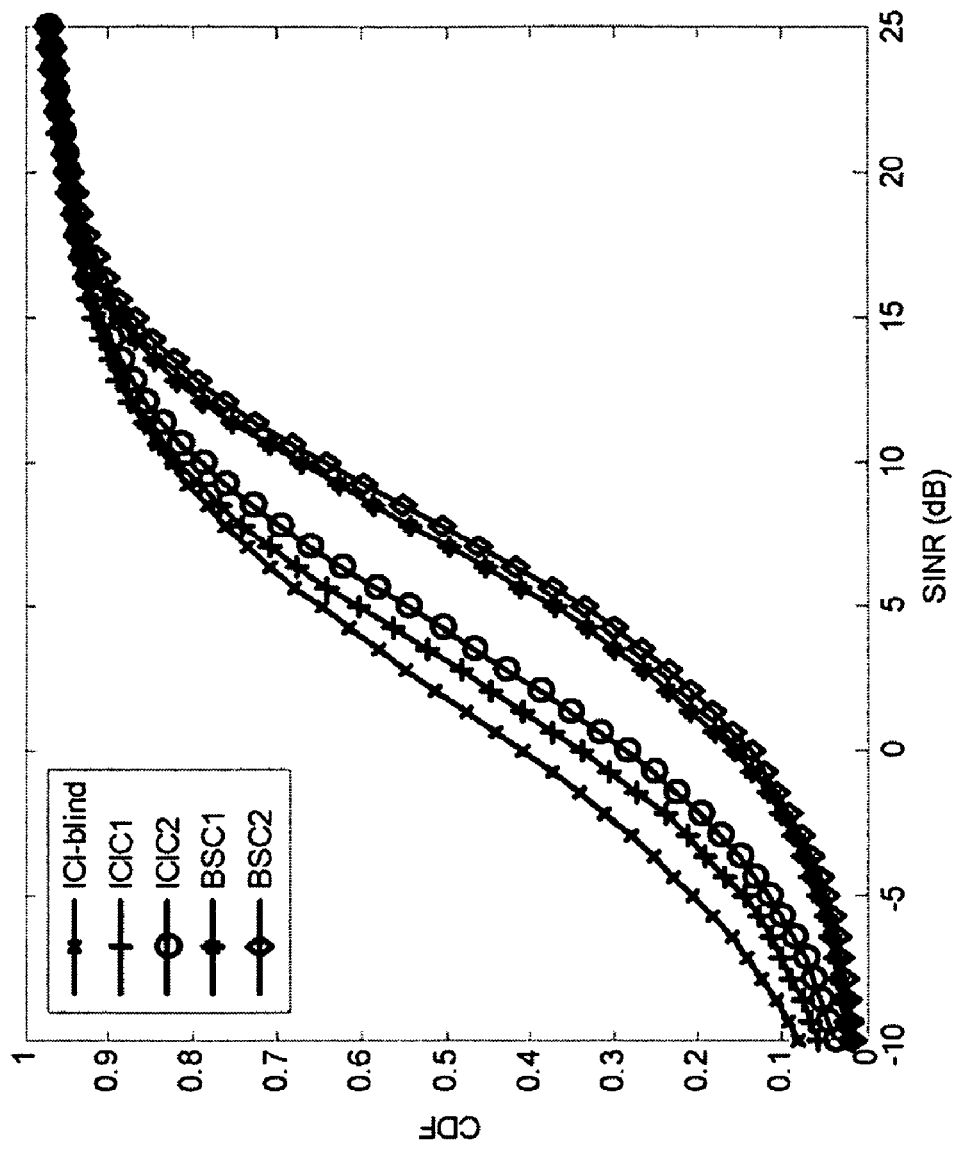
FIG. 10 are graphs comparing conventional and invented allocation methods.

FIG. 10 compares the conventional ICI-blind allocation, with our methods. ICIC1 and ICIC2 use the ICIC scheme in the interference management and differ in channel assignment in the second phase (random and SNR-aware, respectively). Likewise, BSC1 and BSC2 use the BSC scheme in the interference management and differ in channel assignment in the second phase (random and SNR-aware, respectively). The BSC scheme incorporates the BSC weight, $w_B$, in the interference graph whenever this is feasible, while the ICI scheme does not. The graphs show the cumulative distribution function (CDF) versus SINR for the five test schemes. The methods according to the invention have a remarkable improvement on the SINR performance compared to the conventional ICI-blind method. This demonstrates the effectiveness of our interference management and channel assignment methods.

It is to be understood that various other adaptations and modifications can be made within the spirit and scope of the invention. Therefore, it is the object of the appended claims to cover all such variations and modifications as come within the true spirit and scope of the invention.

We claim:

1. A method for allocating channel resources in an orthogonal frequency-division multiple access network including a set of base stations and a set of mobile stations for each base station, comprising the steps of:
   constructing an interference graph, in which nodes in the interference graph represent mobile stations in the orthogonal frequency-division multiple access network, and each edge between a pair of nodes represents a potential interference between the mobile stations represented by the pair of nodes;
   partitioning the interference graph into non-overlapping clusters of the nodes;
   assigning a weight to each edge, in which the weight is proportional to the potential interference, and inversely proportional to a channel quality of the channels, in which weight is selected from $w_B$, $w_S$, $w_N$, $w_0$, $w_1$, $w_2$, $w_A$, where the weights $w_B$, $w_S$, $w_N$, and $w_A$ correspond to weights associated with base station cooperation, space division multiple access, no-interference, and intra-cell interference, respectively, and $w_0$, $w_1$, $w_2$, are inter channel interference at various interference levels depending on geographic locations of the mobile stations represented by the nodes, in which the weights are ranked as $w_B \approx w_S \ll w_N < w_0 < w_1 < w_2 \ll w_A$, and
   allocating channel resources to the mobile stations based on a structure of the partitioned interference graph, the potential interference and the channel quality.

2. The method of claim 1, further comprising:
   maintaining a diversity set for each mobile station, in which the diversity set indicates an anchor base station for the mobile station and any adjacent base stations, and in which a structure of the interference graph and the potential interference is based on the diversity sets.

3. The method of claim 2, further comprising:
   exchanging the diversity sets among all adjacent base stations in the orthogonal frequency-division multiple access network.

4. The method of claim 2, further comprising:
   determining, at each base station based on the diversity sets, whether a set of mobile stations served by the base station can perform space division multiple access;
   determining, at each base station based upon the diversity sets, whether the set of mobile stations served by the base station can perform base station cooperation ;
   determining, at each base station based on information in the diversity set, whether the set of mobile stations served by the base station cause inter-cell interference in the set of mobile stations served by the adjacent base station; and
   determining, at each base station, whether the mobile stations served by the base station causes intra-cell interference within the set of mobile stations served by the base station.

5. The method of claim 1, in which a frequency reuse factor of the orthogonal frequency-division multiple access network is one.

6. The method of claim 1, in which the channel resources are allocated according to inter-cell interference coordination, and in which the allocated channel resources are disjoint.

7. The method of claim 1, in which the channel resources are allocated according to base station cooperation, and in which the allocated channel resources are shared.

8. The method of claim 7, in which the base station cooperation uses space division multiple access.

9. The method of claim 1, in which the partitioning uses a max k-cut process, and in which a sum of the weights of the edges between each cluster is maximized.

10. The method of claim 9, in which the mobiles stations represented by the nodes in a particular cluster are allocated the same channel resources, and mobile stations represented by nodes in adjacent clusters are allocated different channel resources.

11. The method of claim 10, in which the network includes M mobile stations and further comprising:
    assigning M arbitrarily selected nodes to N clusters, one in each cluster; and
    assigning iteratively M-N nodes to the cluster so that an increase in intra-cluster weights is minimized, wherein M and N are integers.

12. The method of claim 1, in which a weight $w_{ab}$ on an edge between node a and node b represents potential interference.

13. The method of claim 1, in which the weights are $$(w_B, w_S, w_N, w_0, w_1, w_2, w_A) = (-10^3, -10^3+50, 0, 50, 100, 200, 10^5).$$

14. The method of claim 1, in which a weight $w_{ab}$ are selected from $$(w_B, w_S, w_N, w_0, w_1, w_2, w_A.$$

15. The method of claim 1, further comprising:
    ordering the clusters in an ascending order of cluster size;
    allocating the channel resources to the mobile stations represented by the nodes in the cluster in the ascending order, such that a sum capacity if the allocated channel resource is a maximum for the cluster.

16. The method of claim 15, further comprising:
    assigning a unique edge weight associated with every sub-channel in the graph for interference caused by intra-cell interference;
    assigning a unique edge weight associated with every sub-channel in the graph for interference caused by inter-cell interference;
    assigning a unique edge weight associated with every sub-channel in the graph for interference caused by space division multiple access; and
    assigning a unique edge weight associated with every sub-channel in the graph for interference caused by base station cooperation.

17. The method of claim 1, further comprising:
    allocating the channel resources to each cluster so a sum capacity of the orthogonal frequency-division multiple access network is maximized.

18. The method of claim 1, further comprising:
    allocating the channel resources to each cluster randomly.

* * * * *